(12) United States Patent
Rayala et al.

(10) Patent No.: US 9,376,100 B2
(45) Date of Patent: Jun. 28, 2016

(54) SYSTEM AND METHOD FOR CONTROLLING A TRANSMISSION

(75) Inventors: Ravi Rayala, Aurora, IL (US); Rogelio Rodriguez, Plainfield, IL (US); Tashmin Lopa, Naperville, IL (US)

(73) Assignee: International Engine Intellectual Property Company, LLC, Lisle, IL (US)

(*) Notice: Subject to any disclaimer, the term of this patent is extended or adjusted under 35 U.S.C. 154(b) by 73 days.

(21) Appl. No.: 14/372,284

(22) PCT Filed: Jan. 18, 2012

(86) PCT No.: PCT/US2012/021626
§ 371 (c)(1),
(2), (4) Date: Jul. 15, 2014

(87) PCT Pub. No.: WO2013/109255
PCT Pub. Date: Jul. 25, 2013

(65) Prior Publication Data
US 2014/0336886 A1   Nov. 13, 2014

(51) Int. Cl.
| G06F 17/00 | (2006.01) |
| B60W 10/11 | (2012.01) |
| B60W 10/06 | (2006.01) |
| F16H 61/10 | (2006.01) |
| B60W 30/14 | (2006.01) |
| B60W 10/04 | (2006.01) |
| F16H 61/16 | (2006.01) |

(52) U.S. Cl.
CPC .............. B60W 10/11 (2013.01); B60W 10/04 (2013.01); B60W 10/06 (2013.01); B60W 30/146 (2013.01); F16H 61/10 (2013.01); B60W 2520/10 (2013.01); B60W 2710/0666 (2013.01); B60W 2710/1005 (2013.01); F16H 61/16 (2013.01)

(58) Field of Classification Search
CPC ... B60W 10/11; B60W 10/04; B60W 30/146; B60W 20/06; B60W 2520/10; B60W 2710/1005; B60W 2710/0666; F16H 61/10; F16H 61/16
See application file for complete search history.

(56) References Cited

U.S. PATENT DOCUMENTS

| 5,048,374 | A | * | 9/1991 | Miyake | B60K 31/107 180/179 |
| 5,809,441 | A | * | 9/1998 | McKee | B60K 28/10 477/125 |
| 5,916,291 | A | * | 6/1999 | McKee | B60W 10/02 192/3.58 |
| 6,738,701 | B2 | | 5/2004 | Wilson | |
| 8,527,160 | B2 | * | 9/2013 | Fox | F16H 61/0202 701/51 |
| 8,751,121 | B2 | * | 6/2014 | Takeuchi | F16H 61/0213 180/65.265 |
| 2008/0270001 | A1 | * | 10/2008 | Seto | B60K 31/00 701/93 |
| 2011/0112733 | A1 | * | 5/2011 | Bulgrien | F16H 61/0246 701/54 |
| 2012/0316746 | A1 | * | 12/2012 | Park | B60W 10/06 701/93 |

* cited by examiner

*Primary Examiner* — David J Hlavka
(74) *Attorney, Agent, or Firm* — Jack D. Nimz; Jeffrey P. Calfa

(57) ABSTRACT

A system for operating a vehicle equipped with an automatic transmission and a vehicle road speed limiter (RSL) which is programmable to limit the maximum vehicle speed for a given transmission gear includes at least on controller. The at least one controller is operable, when the speed limiter (RSL) is active, to determine if the vehicle is operating in a shuttle shifting range based on the current status of preselected operating parameters. When the vehicle is operating in a shuttle shifting range, the at least one controller is operable to control transmission operation to prevent shifting under conditions where shifting would otherwise normally occur.

5 Claims, 8 Drawing Sheets

SYSTEM AND METHOD FOR CONTROLLING A TRANSMISSION

BACKGROUND

Over-the-road trucks and other vehicles, such as school buses, often include a feature for limiting the maximum speed that the vehicle can travel. This feature, commonly referred to as a vehicle speed governor (VSG) or road speed limiter (RSL), is implemented in software that allows the user to program the maximum vehicle speed, e.g., for improving fuel economy, lowering maintenance costs, extending vehicle life and the like. Some systems include the ability to program separate maximum road speeds for different transmission gears.

In vehicles with automatic transmissions, a transmission controller controls operation of the transmission as a function of parameters such as transmission output shaft speed (TOS) and percentage engine torque (PET), which is the ratio of actual engine torque to maximum engine torque. The transmission controller controls the transmission using predetermined shift schedules or maps, which can be in the form of look-up tables that define shift points based on TOS and PET.

FIG. 1 illustrates representative shift schedules that can be implemented by a transmission controller for upshifting and downshifting the transmission between $4^{th}$ and $5^{th}$ gears. Similar shift schedules are provided for the other transmission shift points. The transmission controller uses the shift schedules to determine the appropriate transmission gear based on the current TOS and PET. If the intersect of these points falls below the 5-4 downshift curve, the transmission operates in $4^{th}$ gear. When the intersect moves above the 5-4 upshift curve, the transmission controller sends a signal to the transmission causing it to upshift to $5^{th}$ gear. Similarly, if the vehicle is operating in $5^{th}$ gear and the intersect of TOS and PET drops below the 5-4 downshift curve, the transmission controller sends a signal to the transmission causing it to downshift from $5^{th}$ gear to $4^{th}$ gear.

Undesirable shuttle shifting, that is shifting back and forth between two gears, can occur when a vehicle is traveling at the RSL and the combination of engine torque and output shaft speed is on the gear shiftpoint. For example, assume RSL for $5^{th}$ gear is set at 45 mph and the vehicle is traveling down a flat road at RSL speed. When the vehicle encounters an uphill grade, even a small grade, torque will increase if the driver maintains the vehicle speed at the RSL. As a result, the PET will increase, which may cause the vehicle to downshift, for example, from $5^{th}$ to $4^{th}$ gear. As the grade ends, torque decreases to maintain the given road speed, which may cause the transmission to upshift back to 5th gear. Such transmission shuttle shifting can be undesirable for drivability, for example, passenger comfort, and vehicle performance.

SUMMARY

Embodiments disclosed herein relate to methods and systems for operating a vehicle equipped with an automatic transmission and a vehicle road speed limiter (RSL) which is programmable to limit the maximum vehicle speed for a given transmission gear. In one embodiment a method comprises determining, when RSL is active, whether or not the vehicle is operating in a shuttle shifting range based on the current status of preselected operating parameters. If the vehicle is operating in a shuttle shifting range, the transmission is controlled to prevent shifting under conditions where shifting would otherwise normally occur.

In another embodiment, at least one controller is operable, when the speed limiter (RSL) is active, to determine if the vehicle is operating in a shuttle shifting range based on the current status of preselected operating parameters. When the vehicle is operating in a shuttle shifting range, the at least on controller is operable to control transmission operation to prevent shifting under conditions where shifting would otherwise normally occur.

DETAILED DESCRIPTION

Figure 2:
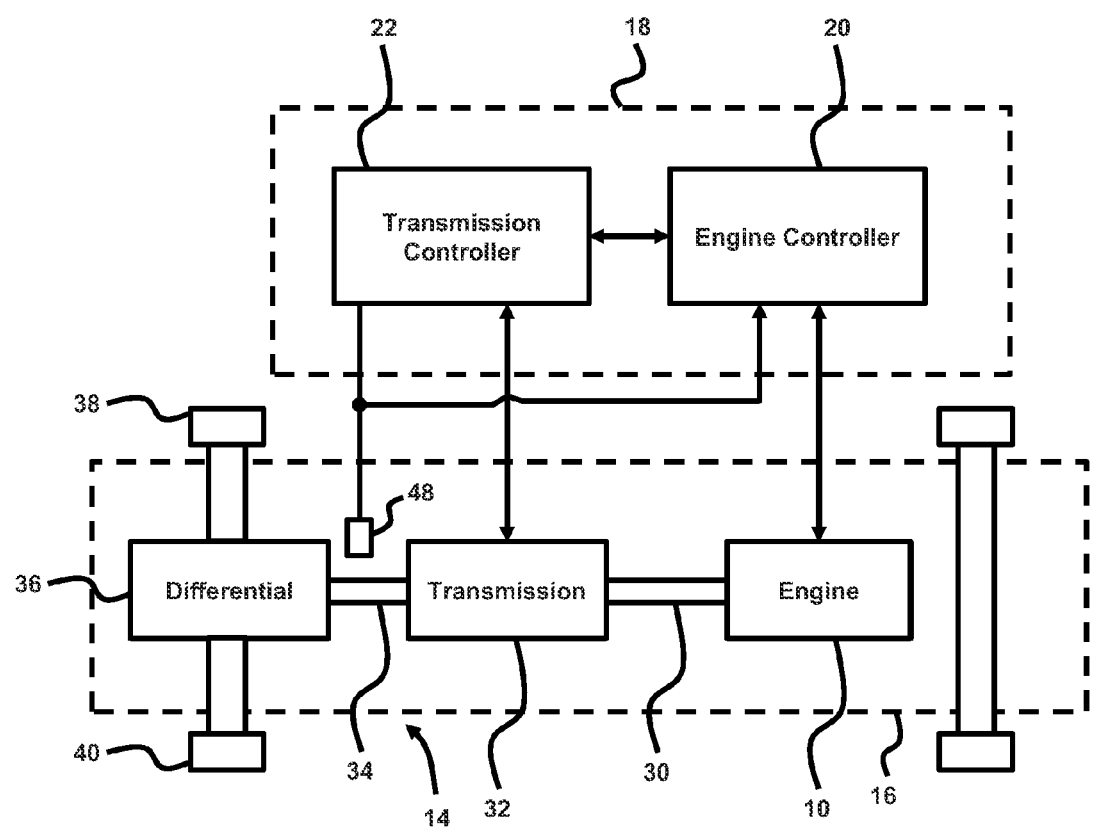
FIG. 2 is a block diagram of an engine and drive train of a vehicle in conjunction with an electronic control system that can be used to prevent shuttle shifting.

FIG. 2 is a block diagram of an engine 10 and drive train 14 of a vehicle 16 in conjunction with an electronic control system 18. In the illustrated embodiment, the electronic control system 18 includes an engine controller 20 and a transmission controller 22. While the engine and transmission controllers 20, 22 are illustrated as discrete controllers, it should be understood that the functions performed by these controllers could be implemented in a single controller or multiple controllers, including two controllers as illustrated. Further, the electronic control system 18 can include a variety of other controllers and modules (not shown) for controlling and/or sensing other vehicle functions, such as ABS, air bags, climate and the like. The controllers (as well as sensors and actuators) can communicate directly with each other and/or via vehicle bus, such as a controller area network.

The engine 10 is coupled by a drive shaft 30 to an automatic transmission 32, which is operable in a plurality of gear ratios or ranges. The output shaft 34 of the transmission 32, in turn, is coupled through a differential 36 to one or both of a pair of wheels 38, 40. The vehicle 16 may, for example, alternatively include tandem axels and/or dual wheels if desired. Similarly, while a two-wheel drive vehicle is illustrated, the vehicle may, alternatively, be an all-wheel drive.

The engine controller 20 regulates engine operating in response to a plurality of inputs (not shown), such as accelerator pedal position, RSL setting and the like. Likewise, the transmission controller 22 operates the transmission 32 as a function of selected parameters. In the illustrated embodiment, the transmission controller 22 controls operation of the transmission 32 as a function of transmission output shaft speed (TOS) and percentage engine torque (PET). As will be appreciated, a variety of other parameters, such as engine speed, engine load or engine mode (for example, cruse, road speed limit, power take-off), could be used to control operation of the transmission 32.

A sensor 48 measures the TOS and transmits a signal representative thereof to the transmission controller 22 and/or the engine controller 20. PET corresponds to the ratio of actual engine torque to maximum engine torque, as calculated by the following formula:

$$PET = \frac{\text{Actual Engine Torque}}{\text{Max. Engine Torque}}$$

The engine controller 20 determines actual engine torque based on driver demand, for example, accelerator pedal position or vehicle speed limit. Maximum engine torque is an absolute limit that is set by the manufacturer to prevent engine damage. The engine controller 20 calculates PET, as discussed above, and transmits the PET to the transmission controller 22.

The transmission controller 22 in turn uses the PET received from the engine controller 20 and TOS from the sensor 48 to control operation of the transmission 32 in accordance with predetermined shift schedules or maps. The shift schedule can be a group of table look-up functions, which define shift points based on TOS and PET.

As discussed above, FIG. 1 is a non-limiting example of shift schedules that can be implemented by the transmission controller 22 for upshifting and downshifting the transmission 32 between $4^{th}$ and $5^{th}$ gears. Similar shift schedules are provided for the other transmission shift points. The transmission controller 22 uses the shift schedules to determine the appropriate transmission gear based on the current TOS and the current PET. If the intersect of these points falls below the 5-4 downshift curve, the transmission 32 operates in $4^{th}$ gear. When the intersect moves above the 5-4 upshift curve, the transmission controller 22 sends a signal to the transmission 32 causing it to upshift to $5^{th}$ gear. Similarly, if the vehicle 16 is operating in $5^{th}$ gear and the intersect of TOS and PET drops below the 5-4 downshift curve, the transmission controller 22 sends a signal to the transmission 32 causing it to downshift from $5^{th}$ gear to $4^{th}$ gear.

In prior systems, shuttle shifting can occur when the vehicle 16 is operated at the RSL speed for a given gear. The system and method disclosed herein avoid such shuttle shifting by preventing gear changes, for example, downshifts, under certain operating conditions where a gear change would normally occur based on the shift schedule.

Figure 3A:
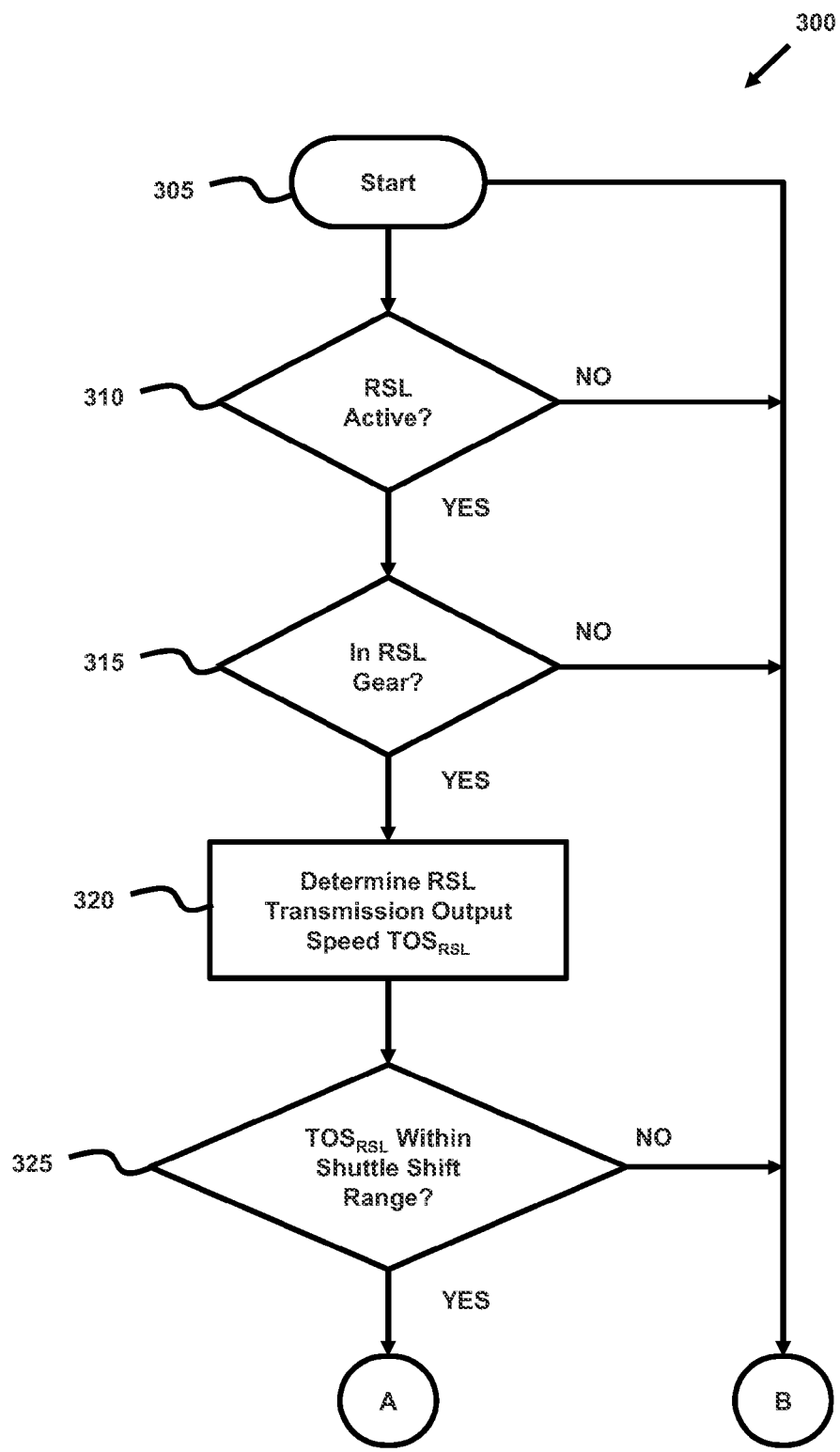
FIGS. 3A and 3B are a flow chart illustrating an exemplary method for preventing shuttle shifting.
Figure 3B:
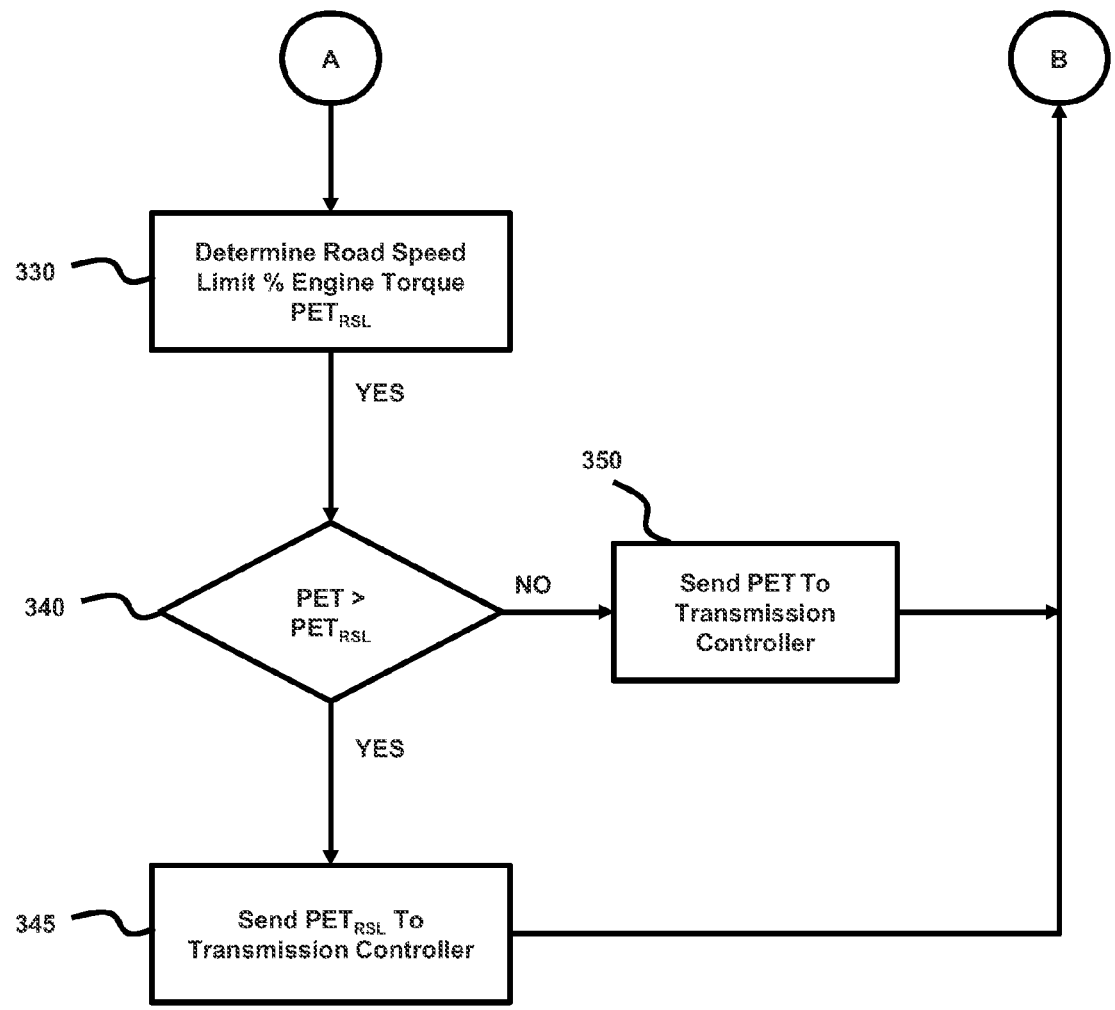

FIGS. 3A and 3B are a flow chart illustrating an exemplary method 300 for preventing shuttle shifting. The method determines whether or not the vehicle 16 is operating in a shuttle shifting range based on preselected operating parameters. If the vehicle 16 is operating in a shuttle shifting range, the method controls transmission operation to prevent shifting under conditions where shifting would otherwise normally occur.

The exemplary method 300 can begin at step 305. Control is then passed to step 310, where the method determines whether RSL mode is active. The engine controller 20, for example can perform this step by checking a memory location or flag that designates the status, for example, active or inactive, of the RSL mode.

If RSL mode is not active, control is returned to step 305. If RSL mode is active, control is passed to step 315. In step 315, the method determines whether the transmission is currently in the highest gear for a given RSL setting. This step can be performed, for example, by the engine controller 20 checking the status of a memory location or flag that designates the RSL gear(s) and further by communicating with the transmission controller to determine the present operating gear. The system may allow the user to have RSL settings for different gears. For example, the user may set an RSL of 45 mph for $5^{th}$ gear and another RSL of 40 mph for $4^{th}$ gear.

If RSL is active (in step 310) and the transmission 32 is in the top RSL gear (in step 315), control is passed to step 320. Otherwise, control is returned to step 305.

In step 320, the method determines a road speed limit transmission output speed ($TOS_{RSL}$) based on the current vehicle configuration. For example, $TOS_{RSL}$ can be calculated as a function of RSL, axel ratio and tire size in accordance with the following formula:

$$TOS_{RSL}=(\text{Rear Axle Ratio} \times \text{Tire Size} \times \text{Vehicle Speed})/60$$

Where tire size is in rotations per mile, vehicle speed is in miles per hour and $TOS_{RSL}$ is in revolutions per minute.

As will be appreciated, if there are multiple RSL settings, the $TOS_{RSL}$ will be different for each RSL Control is then passed to step 325, where the method determines if $TOS_{RSL}$ falls within a predetermined shuttle shifting range. The shuttle shifting range is a range of transmission output shaft speeds where shuttle shifting is known to occur when the vehicle 16 is operating at the RSL for a given gear. This range can be determined by analyzing the transmission shift schedule where downshifts from the top RSL gear occur.

Figure 4:
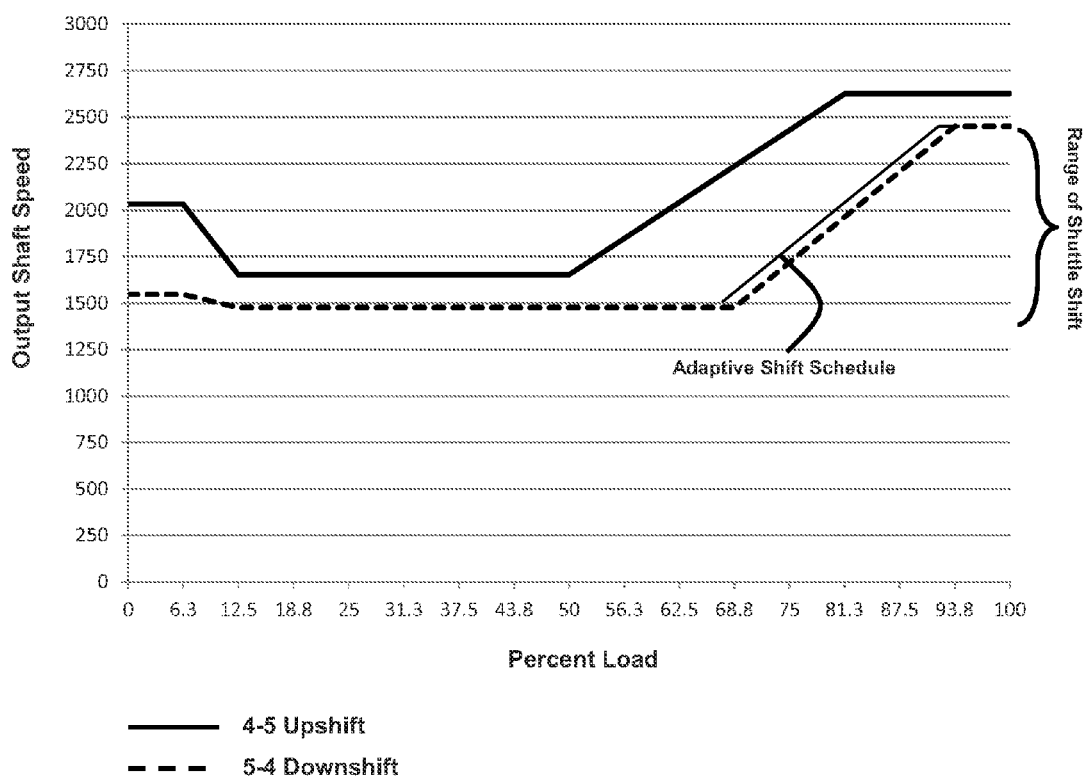
FIG. 4 is a graph of illustrating exemplary shift schedules implemented based on transmission output speed versus percentage engine load, and an adaptive downshift schedule for preventing shuttle shifting.

This can better be understood with reference to FIG. 4, which is a non-limiting graph of illustrating exemplary shift schedules implemented based on TOS and PET, and further illustrating an adaptive downshift schedule that is used to prevent shuttle shifting. The shuttle shifting range in this example is the diagonal portion of the 5-4 downshift curve, which extends between 1450 rpm and 2450 rpm.

Thus, when the vehicle 16 is in $5^{th}$ gear and RSL is active, the method determines, in step 325, whether the road speed limited output speed ($TOS_{RSL}$) falls between 1450 rpm and 2450 rpm, i.e., within the shuttle shifting range. If it does not, control is returned to step 305. However, if $TOS_{RSL}$ is within the shuttle shifting range, control is passed to the step 330.

In step 330, the method determines a road speed limit percentage engine torque ($PET_{RSL}$) as a function of the actual TOS. Specifically, the engine controller 20 accesses a look-up table that provides a road speed limit percentage engine torque ($PET_{RSL}$) for based on actual TOS. The method of FIG. 3 prevents downshifting by preventing the Percent Engine Torque (PET) that is sent to the transmission controller from going above road speed limit percentage engine torque ($PET_{RSL}$) to avoid the downshift.

This can better be understood with reference to FIG. 4 and the following tables:

TABLE 1

Transmission Shift Schedule

| | % Load | | | | | | | | | | | | | | | | |
|---|---|---|---|---|---|---|---|---|---|---|---|---|---|---|---|---|---|
| | 0 | 6.3 | 12.5 | 18.8 | 25 | 31.3 | 37.5 | 43.8 | 50 | 56.3 | 62.5 | 68.8 | 75 | 81.3 | 87.5 | 93.8 | 100 |
| 4 to 5 (gear shift) | 2031 | 2031 | 1652 | 1652 | 1652 | 1652 | 1652 | 1652 | 1652 | 1847 | 2041 | 2236 | 2430 | 2625 | 2625 | 2625 | 2625 |
| 5 to 4 (gear shift) | 1546 | 1546 | 1475 | 1475 | 1475 | 1475 | 1475 | 1475 | 1475 | 1475 | 1475 | 1475 | 1719 | 1963 | 2206 | 2450 | 2450 |

TABLE 2

Table used for Adaptive Transmission Shift Schedule Strategy

| | Output Shaft Speed | | | | | | | | | | | | | | | | |
|---|---|---|---|---|---|---|---|---|---|---|---|---|---|---|---|---|---|
| | 1546 | 1546 | 1475 | 1475 | 1475 | 1475 | 1475 | 1475 | 1475 | 1475 | 1475 | 1475 | 1719 | 1963 | 2206 | 2450 | 2450 |
| % Load (Output) | 0 | 6.3 | 12.5 | 18.8 | 25 | 31.3 | 37.5 | 43.8 | 50 | 56.3 | 62.5 | 68.8 | 75 | 81.3 | 87.5 | 93.8 | 100 |

Table 1 is a transmission shift schedule that corresponds to the shift schedules shown in FIG. 4. Table 1 provides upshift and downshift points as a function of TOS and PET. These points are graphed to provide the shift curves shown in FIG. 4. Table 2 illustrates a look-up table that can be used by the method of FIG. 3. As can be seen, the table provides a PET for a given TOS. The PET corresponds to the PET where a downshift from $5^{th}$ gear to $4^{th}$ gear would normally occur. The method limits sets the road speed limit percentage engine torque ($PET_{RSL}$) to a predetermined percentage, for example, 90 percent, of the PET that is obtained from the look-up table. Alternatively, the look-up table could be modified to contain the $PET_{RSL}$ values. The adaptive shift curve corresponding to the $PET_{RSL}$ is illustrated in FIG. 4. As can be seen, the adaptive shift curve parallels and is shifted to the left of the normal 4-5 downshift curve.

Control is then passed to step 340 where the method determines if the road speed limit percentage engine torque ($PET_{RSL}$) is greater than the actual percentage engine torque (PET). If $PET_{RSL}$ is greater than the actual PET, control is passed to step 345, where the road speed limit percentage engine torque ($PET_{RSL}$) is sent to the transmission controller. Otherwise, control is passed to step 350 where the actual percentage engine torque (PET) is transmitted to the transmission controller. In other words, the method limits the percentage engine torque signal that is sent to the transmission controller to the lesser of road speed limit percentage engine torque ($PET_{RSL}$) and actual percentage engine torque (PET). Thus, by transmitting the road speed limit percentage engine torque ($PET_{RSL}$) to the transmission controller under the conditions described above, the method prevents a downshift that would otherwise occur when the vehicle 16 is operating in the shuttle shift range. In other words, the method provides the transmission controller with a percentage engine torque that is lower than the actual PET, which maintains the transmission in the higher gear and prevents shuttle shifting.

Figure 1:
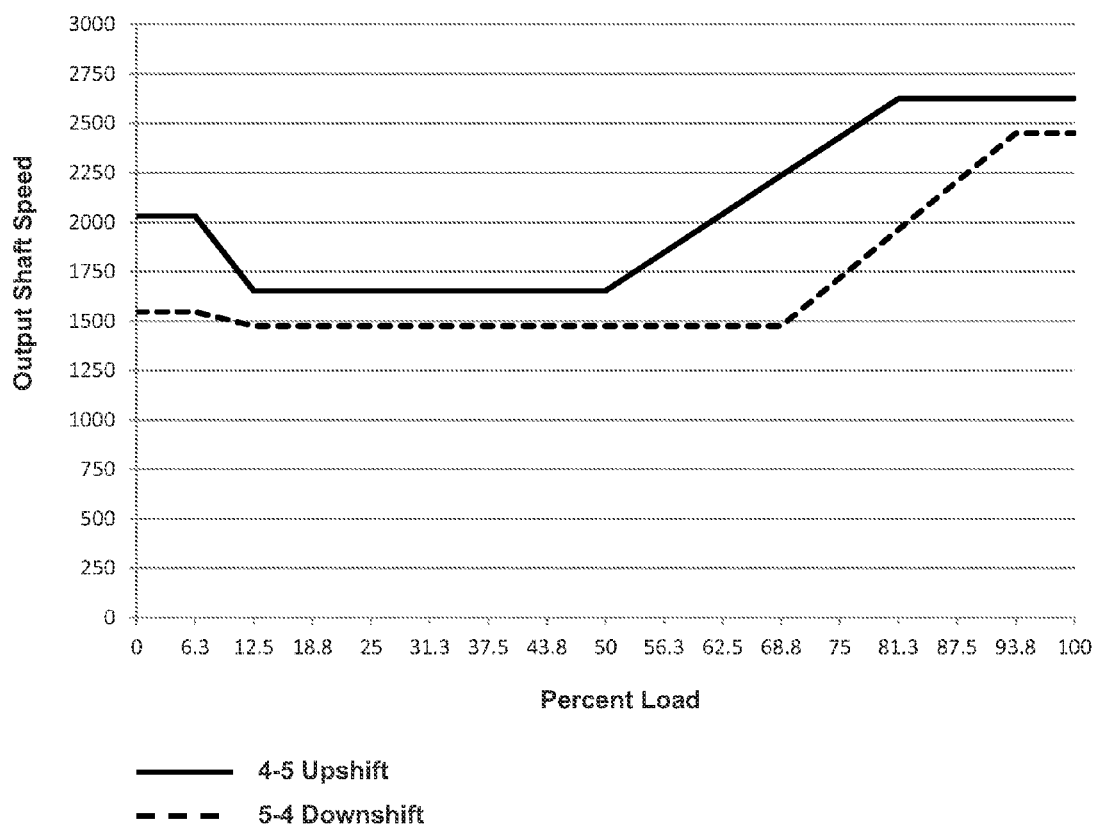
FIG. 1 is a graph of illustrating exemplary shift schedules implemented based on transmission output speed versus percentage engine load.
Figure 5:
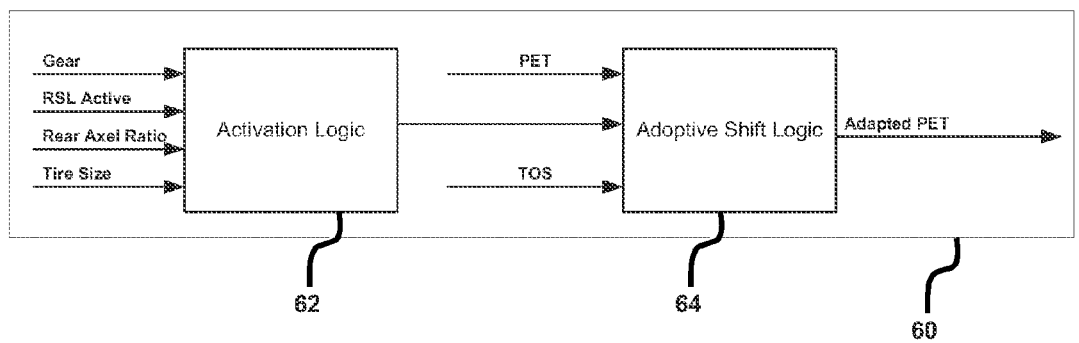
FIG. 5 is a diagram illustrating a control strategy for preventing shuttle shifting.

FIG. 5 is a block diagram illustrating shuttle shift logic 60 that can be incorporated in the engine controller 20 of FIG. 1. The shuttle shift logic 60 can be embodied in hardware, software or a combination thereof. The shuttle shift logic 60 includes activation logic 62 for determining whether torque limiting should be activated and adaptive shift logic 64 for providing adaptive transmission control when the torque limiting is activated by the activation logic 62. More specifically, the activation logic 62 determines whether or not the vehicle 16 is operating in a shuttle shift range based on the status of preselected operating parameters. If the vehicle 16 is in a shuttle shift range, the activation logic 62 transmits an activation signal to the adaptive shift logic 64. In response to this signal, the adaptive shift logic 64 controls transmission operation to prevent shifting under conditions where shifting would otherwise normally occur.

In the illustrated embodiment, inputs to activation logic 62 include the current transmission gear, a signal indicating whether or not RSL is active, the rear axel ratio of the vehicle 16 and the tire size for the vehicle. The current transmission gear can be obtained from the transmission controller 22, for example. The rear axel ratio and tire size can be programmed into a non-volatile memory such as an EPROM. The status of the RSL can be determined by accessing a memory location or flag that designates the status, for example, active or inactive, of the RSL mode.

By way of non-limiting example, the activation logic 62 can generally execute steps 310-325 from FIG. 3 to determine whether or not shuttle shifting torque limiting should be activated. Specifically, the activation logic 62 initially determines whether RSL mode is active by, for example, accessing a memory location or flag that designates the status, for example, active or inactive, of the RSL mode. If RSL mode is active, the logic then determines whether the transmission is currently in the highest gear for a given RSL setting. For example, the engine controller 20 can communicate with the transmission controller 22 to determine the current transmission operating gear. The activation logic 62 can also access memory that designates the RSL gear(s) and determine whether the current transmission operating gear corresponds to an RSL gear.

If the activation logic 62 determines that RSL is active and the transmission is in the top RSL gear, the activation logic 62 then determines a road speed limit transmission output speed ($TOS_{RSL}$) based on the current vehicle configuration. For example, $TOS_{RSL}$ can be calculated as a function of RSL, axel ratio and tire size in accordance with the following formula:

$$TOS_{RSL} = (\text{Rear Axle Ratio} \times \text{Tire Size} \times \text{Vehicle Speed})/60$$

Where tire size is in rotations per mile, vehicle speed is in miles per hour and $TOS_{RSL}$ is in revolutions per minute.

The activation logic 62 then determines whether or not the road speed limit transmission output speed $TOS_{RSL}$ falls within a predetermined shuttle shifting range. As discussed above, the shuttle shifting range is a range of transmission output shaft speeds where shuttle shifting occurs when the vehicle 16 is operating at the RSL for a given gear. If $TOS_{RSL}$ is within the shuttle shifting range, the activation logic 62 transmits a signal to the adaptive shift logic 64 indicating that shuttle shifting torque limiting should be activated.

When shuttle shifting torque limiting is active, the adaptive shift logic 64 controls transmission operation to prevent shifting under conditions where shifting would otherwise normally occur. By way of non-limiting example, the activation logic 62 can generally execute steps 330-350 from the flow chart shown in FIG. 3 to prevent shifting under conditions where shifting would otherwise normally occur. When torque limiting is active, the adaptive shift logic 64 can initially determine a road speed limit percentage engine torque ($PET_{RSL}$) as a function of the actual TOS. Specifically, the adaptive shift logic 64 accesses a look-up table that provides a road speed limit percentage engine torque ($PET_{RSL}$) for a given TOS. The road speed limit percentage engine torque ($PET_{RSL}$) values can be set as a predetermined percentage, for example, 98% of the actual percentage engine torque (PET) that would normally cause the vehicle 16 to downshift at a given TOS. This is illustrated by the adaptive shift curve that is shown in FIG. 4.

The adaptive shift logic 64 then determines if the road speed limit percentage engine torque ($PET_{RSL}$) is greater than the actual percentage engine torque (PET). If $PET_{RSL}$ is greater than the actual PET, the adaptive shift logic 64 transmits the road speed limit percentage engine torque ($PET_{RSL}$) to the transmission controller 22. Otherwise, the adaptive shift logic 64 transmits the actual percentage engine torque (PET) to the transmission controller 22. Thus, by transmitting the road speed limit percentage engine torque ($PET_{RSL}$) to the transmission controller 22 under the conditions described above, the shuttle shift logic 60 prevents a downshift that would otherwise occur when the vehicle 16 is operating in the shuttle shift range.

Figure 6:
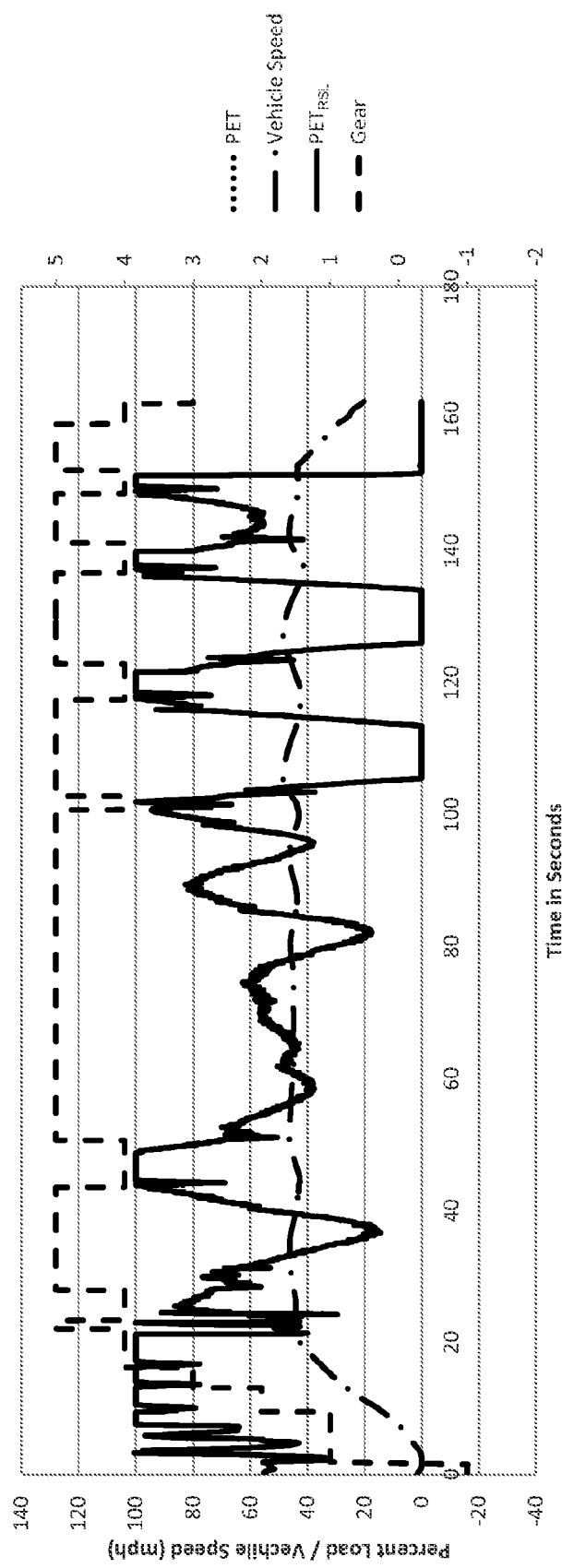
FIG. 6 is a graph illustrating transmission shifting when system and method for preventing shuttle shifting are not employed.
Figure 7:
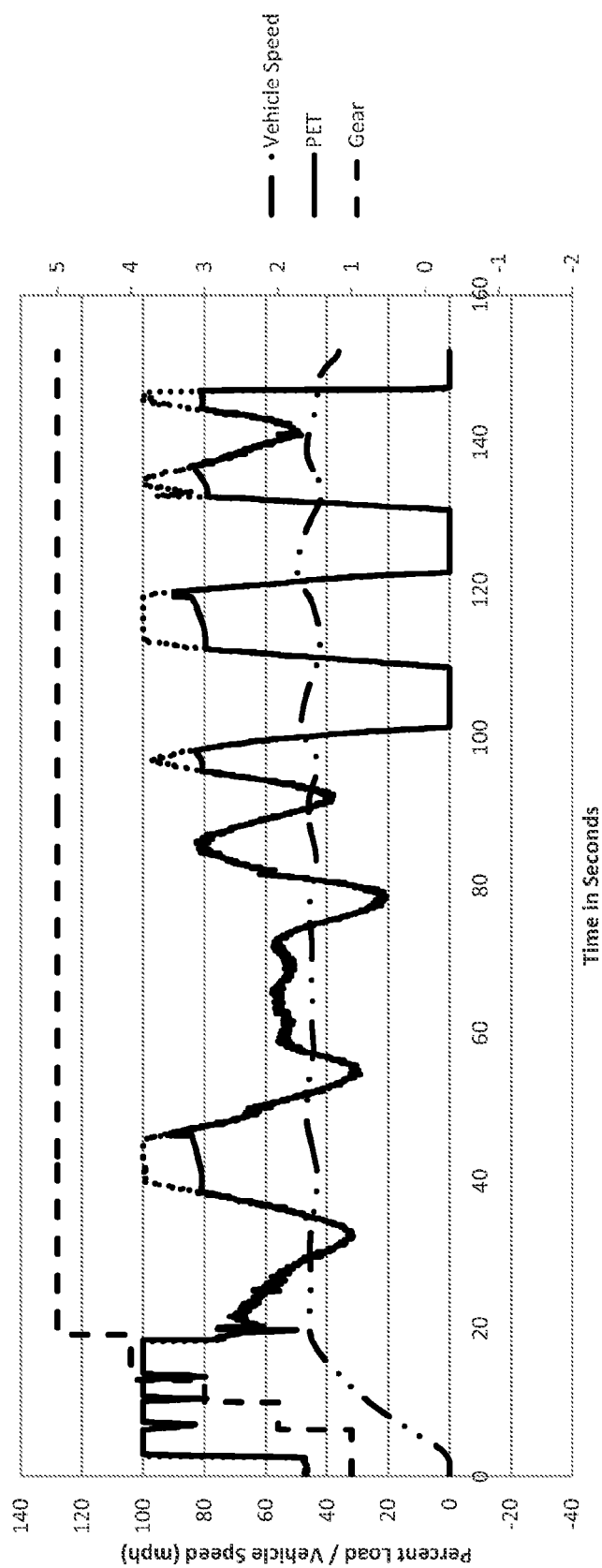
FIG. 7 is a graph illustrating transmission shifting when system and method for preventing shuttle shifting are employed.

Operation of the system and method described above can better be understood by reference to FIGS. 6 and 7. RSL is set at 45 mph for $5^{th}$ gear in both graphs. FIG. 6 illustrates transmission shifting when system and method for preventing shuttle shifting are not employed. As the vehicle 16 accelerates from a stop up to the RLS speed, the transmission controller 22 upshifts the transmission 32 through the gears (e.g., $1^{st}$ to $2^{nd}$ to $3^{rd}$ to $4^{th}$ to $5^{th}$) in accordance with the transmission shift schedule. As the vehicle 16 continues to travel at (or near) the RSL of 45 mph, the transmission 32 generally stays in $5^{th}$ gear. However, when the vehicle 16 encounters grade changes and the driver maintains the vehicle 16 at the RSL speed, the transmission 32 shifts back and forth (shuttle shifts) between $4^{th}$ and $5^{th}$ gear as the POT increases and decreases. For example, in the illustrated embodiment, where RSL is 45 mph, the transmission upshifts from $4^{th}$ to $5^{th}$ gear when the POT rises above 78%. Likewise, the transmission 32 downshifts from $5^{th}$ gear to $4^{th}$ gear when the POT drops below 56%.

FIG. 7 illustrates transmission shifting when system and method for preventing shuttle shifting are employed. As in FIG. 6, the transmission controller 22 upshifts the transmission 32 through its gears (e.g., $1^{st}$ to $2^{nd}$ to $3^{rd}$ to $4^{th}$ to $5^{th}$) in accordance with the transmission shift schedule as the vehicle 16 accelerates from a stop up to the RLS speed. As the vehicle 16 continues to travel at (or near) the RSL of 45 mph, the transmission 32 generally stays in $5^{th}$ gear. When the vehicle 16 encounters grade changes and the driver maintains the vehicle 16 at the RSL speed, the system and method prevent downshifts from $5^{th}$ gear to $4^{th}$ gear that would normally occur, by limiting the POT that is seen by the transmission controller 22 to lesser of road speed limit percentage engine torque ($PET_{RSL}$) and actual percentage engine torque (PET). Thus, by transmitting the road speed limit percentage engine torque ($PET_{RSL}$) to the transmission controller 22 under the conditions described above, the method prevents a downshift that would otherwise occur when the vehicle 16 is operating in the shuttle shift range. In other words, the method provides the transmission controller 22 with a percentage engine torque that is lower than the actual PET, which maintains the transmission 32 in the higher gear and prevents shuttle shifting.

What is claimed is:

1. A method of operating a vehicle equipped with an automatic transmission and a vehicle road speed limiter (RSL) which is programmed to limit the maximum vehicle speed when in an active mode, the method comprising:
   determining whether the RSL is in active mode;
   when the RSL is in active mode, determining whether the transmission is in the highest gear for the RSL
   when RSL is in active mode and the transmission is in the highest gear for the RSL setting:
   determining the transmission output speed (TOS);
   determining whether the transmission output speed (TOS) is within a shuttle shift range;
   when it is determined that the transmission output speed (TOS) is within the shuttle shift range:
   i) determining the road speed limit percentage of engine torque ($PET_{RSL}$);
   ii) determining the percent engine torque (PET);
   iii) determining whether the percent engine torque (PET) is greater than the road speed limit percentage of engine torque ($PET_{RSL}$);
   a) when the percent engine torque (PET) is greater than the road speed limit percentage of engine torque ($PET_{RSL}$), sending the PET data to the transmission controller;
   b) when the percent engine torque (PET) is not greater than the road speed limit percentage of engine torque ($PET_{RSL}$), sending the $PET_{RSL}$ data to the transmission controller instead of sending the PET data to the transmission controller; and
   c) shifting gears of the transmission based on one or the other of the PET signals and/or $PET_{RSL}$ signals sent to the transmission controller.

2. The method of claim 1 in which the step of determining whether the RSL is in active mode comprises checking a memory location or flag that designates the RSL status as being either active or in active.

3. The method of claim 1 in which the step of determining whether the transmission is in the highest gear for the RSL comprises a control unit checking the status of a memory location or flag of the control unit that designates the RSL gear and further by communicating with the transmission controller to determine the present operating gear.

4. The method of claim 1 in which a plurality of RSL settings for different gears is provided.

5. The method of claim 1 in which the $TOS_{RSL}$ is calculated as a function of vehicle axle ratio, vehicle tire size and vehicle speed.

* * * * *